Oct. 1, 1963   R. A. BROCKBANK ETAL   3,105,676
SUBMARINE CABLE LAYING APPARATUS
Filed Oct. 3, 1961   5 Sheets-Sheet 1

Inventors,
ROBERT A. BROCKBANK, John
PIGGOTT, ERIC F.S. CLARKE,
ROBERT J. JURY, & EWART W.E.TAYLOR.

by Hall + Houghton
Attorney.

Oct. 1, 1963    R. A. BROCKBANK ETAL    3,105,676
SUBMARINE CABLE LAYING APPARATUS
Filed Oct. 3, 1961    5 Sheets—Sheet 2

Inventors.
ROBERT A. BROCKBANK,
JOHN PIGGOTT,
ERIC F.S. CLARKE,
ROBERT J. JURY, &
EWART W.E. TAYLOR.
by /s/ Hall & Houghton
Attorney.

Oct. 1, 1963  R. A. BROCKBANK ETAL  3,105,676
SUBMARINE CABLE LAYING APPARATUS

Filed Oct. 3, 1961  5 Sheets-Sheet 3

Inventors,
ROBERT A. BROCKBANK,
JOHN PIGGOTT,
ERIC F. S. CLARKE,
ROBERT J. JURY, &
EWART W. E. TAYLOR,
by Hall & Houghton
Attorney.

Oct. 1, 1963  R. A. BROCKBANK ETAL  3,105,676
SUBMARINE CABLE LAYING APPARATUS
Filed Oct. 3, 1961  5 Sheets-Sheet 4

Inventors.
ROBERT A. BROCKBANK,
John PIGGOTT,
ERIC F. S. CLARKE,
ROBERT J. JURY, &
EWART W. E. TAYLOR.
by Hall + Houghton Attorney.

Oct. 1, 1963  R. A. BROCKBANK ETAL  3,105,676
SUBMARINE CABLE LAYING APPARATUS
Filed Oct. 3, 1961  5 Sheets-Sheet 5

Inventors
ROBERT A. BROCKBANK,
JOHN PIGGOTT, ERIC F.S. CLARKE
ROBERT J. JURY, & EWART
W.E. TAYLOR
By Halls Houghton Atty.

United States Patent Office 3,105,676
Patented Oct. 1, 1963

3,105,676
SUBMARINE CABLE LAYING APPARATUS
Robert Alston Brockbank, Kenton, Harrow, Middlesex, John Piggott, Northwood, Middlesex, Eric Fifield Stuart Clarke, Kenton, Harrow, Middlesex, Robert John Jury, Pinner, Middlesex, and Ewart William Edward Taylor, Stanmore, Middlesex, England, assignors to Her Majesty's Postmaster General, London, England
Filed Oct. 3, 1961, Ser. No. 142,712
8 Claims. (Cl. 254—190)

This invention relates to submarine-cable laying apparatus and has particular reference to apparatus for laying submarine-cable of the kind described in British patent specification No. 703,782. That specification describes a submarine-cable having a core including a high tensile strength member which provides the tensile strength which the cable is required to possess. No external armouring is provided. Such a cable hereinafter is referred to as a "lightweight cable."

Figure 1:
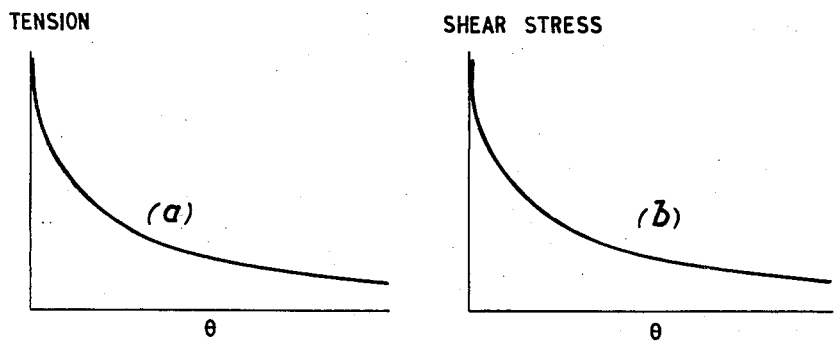

During laying of a conventional submarine-cable having high shear strength external armouring, a restraining force usually is applied to the cable by passing the cable around a braked drum and providing a low back-tension on the cable on the feed-on side of the drum. As is well-known, in a cable passing around the drum, the theoretical distribution of tension along the portion of the cable in contact with the drum from the feed-off point towards the feed-on point follows an exponential law of the form shown in FIG. 1(a) of the accompanying drawings. The rate of change of tension is proportional to the shear stress existing between the cable and the drum and this relationship is shown in FIG. 1(b) of the accompanying drawings. The effect of the concentration of shear stress towards the high-tension (feed-off) end of the drum is usually negligible on an externally armoured cable.

However, in the case of a lightweight cable the external restraining force, which during laying is applied to the cable, has to be transmitted across the low shear strength component layers of the cable to the high tensile member in the core. When laying lightweight cable with a known drum the high shear stress involved can be of sufficient magnitude to have a detrimental effect on the mechanical structure and the electrical constants of the cable. Certain prior proposed forms of cable laying apparatus involve the use of braked drums, pulleys or V-sheaves. An example of such cable laying apparatus is described in British patent specification No. 743,862. In such apparatus the effects on the structure and electrical performance of a lightweight cable may be even more severe due to the effective increase in the coefficient of friction when the cable is located in a groove.

It is an object of the present invention to provide submarine-cable laying apparatus including a drum, pulley or sheave having a peripheral portion in contact with the cable being laid and around which the total tension to be absorbed can be distributed in a more uniform manner thereby reducing the possibility of damage to the cable being laid.

In accordance with the present invention, therefore, submarine-cable laying apparatus includes a drum, pulley or sheave having a hub portion, means for coupling the drum, pulley or sheave to a braking mechanism, a plurality of rigid elements spaced circumferentially around the drum, pulley or sheave, the elements having arcuate periperal surfaces which together provide a cable-receiving surface for the drum, pulley or sheave, resilient arms predistorted from a straight condition and angularly spaced around the hub portion, respective rigid elements connected to and between at least two next adjacent resilient arms, biasing means operatively associated with the resilient arms of respective rigid elements to displace circumferentially the rigid elements whereby the resilient arms associated therewith are biased towards a straightened condition and thereby preloaded by a force dependent upon the displacement, the biasing means permitting of limited circumferential movement of their associated rigid elements in the direction of a cable being laid, in use of the apparatus the movement of an element due to shear stress between the cable being laid and that element being sufficient to prevent the tension drop along the portion of the cable in contact with that element from exceeding a predetermined magnitude.

Figure 2:
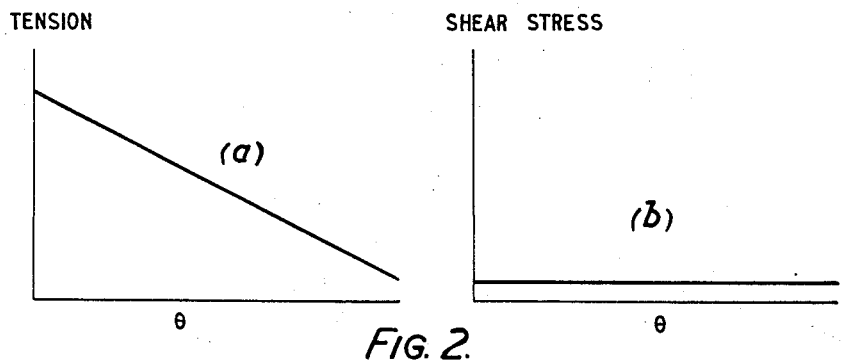

In use of submarine-cable laying apparatus including a drum, pulley or sheave in accordance with the invention, a cable being laid passes for less than one complete turn around the drum, pulley or sheave which is coupled to a suitable braking mechanism as is known in the art. By suitable design of the drum, pulley or sheave the tension and shear stress characteristics shown in FIGS. 2(a) and 2(b) of the accompanying drawings can be approached. The magnitude of shear stress shown in FIG. 2(b) is a fraction of the maximum shear stress shown in FIG. 1(b). The resilient couplings may be so designed that the circumferential movement of the cable-receiving elements is restricted in accordance with a suitable displacement/shear stress characteristic, for example one of the characteristics (a), (b) or (c) shown in FIG. 3 of the accompanying drawings. In general, a preferred characteristic will probably be that shown by curve 3(c) for a cable which extends slightly under tensile strength and which cable may vary in its characteristics, for example in respect of coefficient of friction and tensile strength.

Conveniently the rigid elements may have respective apertures which extend parallel to the axis of the drum, pulley or sheave. Blocks are provided which extend through the respective apertures and which are mounted for eccentric rotation. Each block co-operates with a wall of the aperture and its associated rigid element and circumferentially displaces that element to bias the resilient arms associated therewith towards a straightened condition. The blocks may be surfaced with an elastomeric material, for example rubber.

Figure 3:
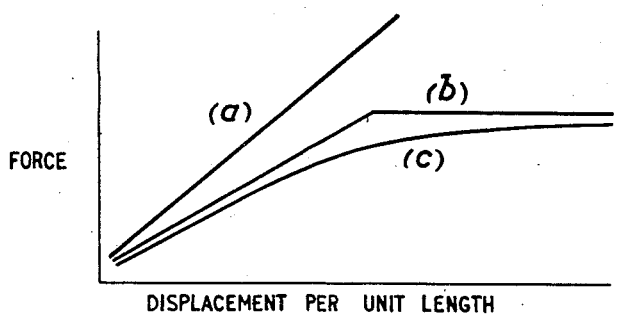

The resilient arms may be made of steel strip and conveniently these resilient arms have a force/displacement characteristic as shown in one of the curves of FIG. 3 of the drawings.

Figure 4:
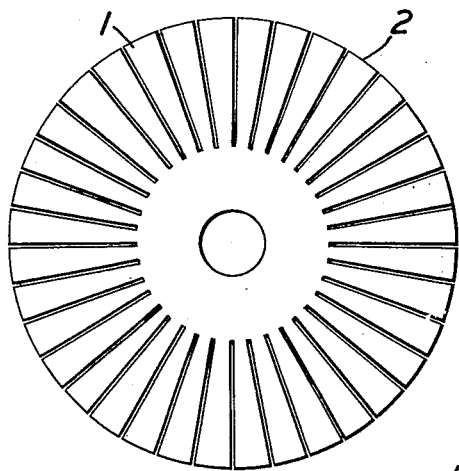
Figure 5:
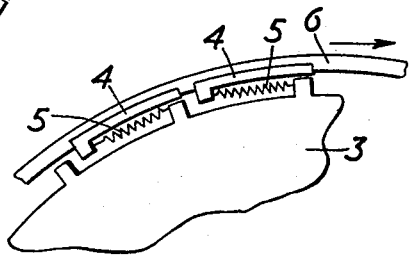
Figure 6:
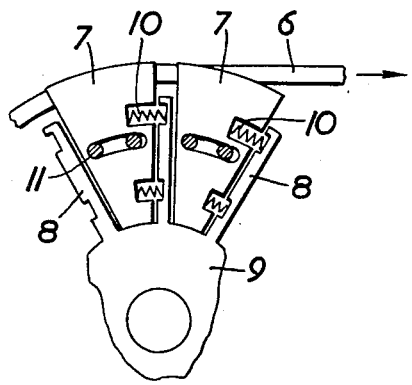
Figure 7:
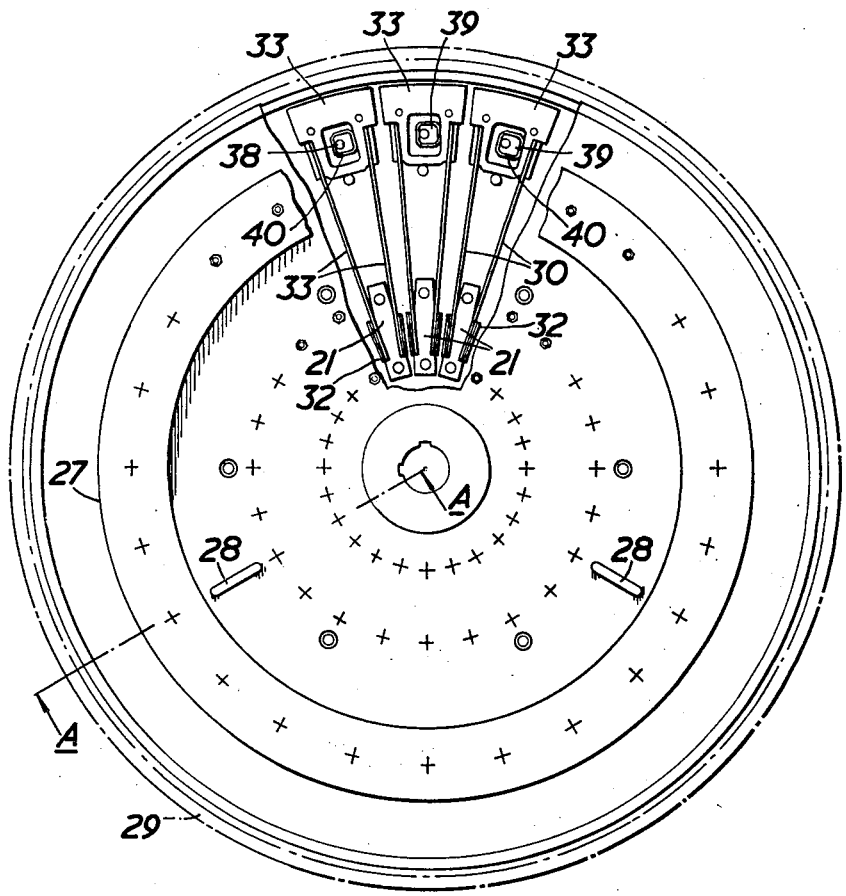
Figure 9:
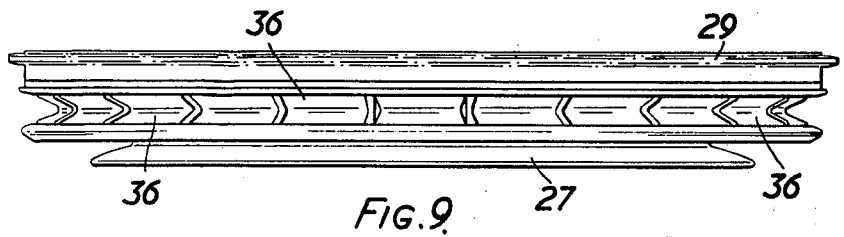
Figure 8:
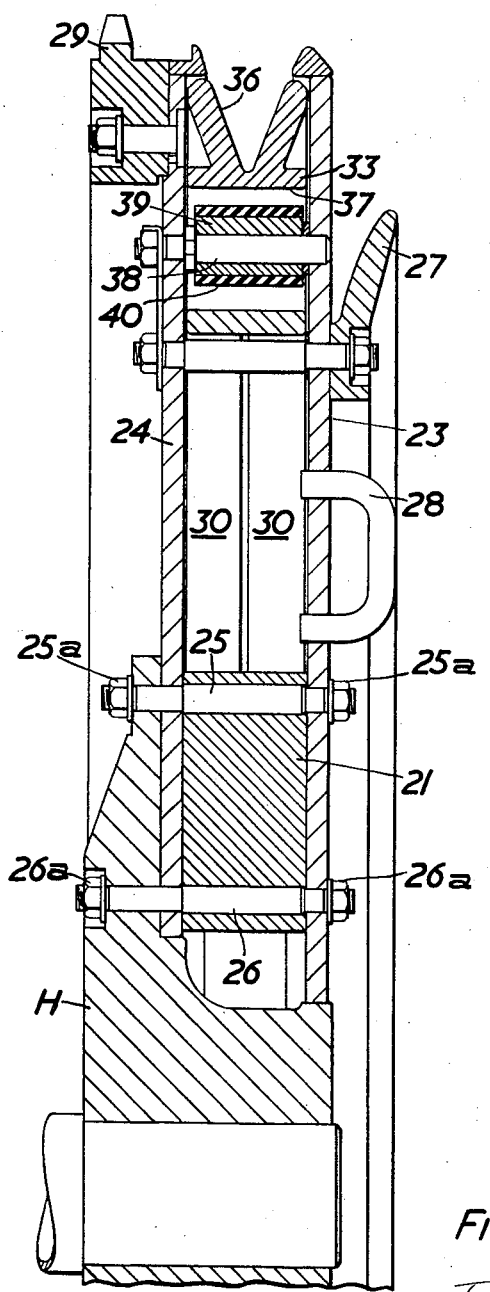
Figure 10:
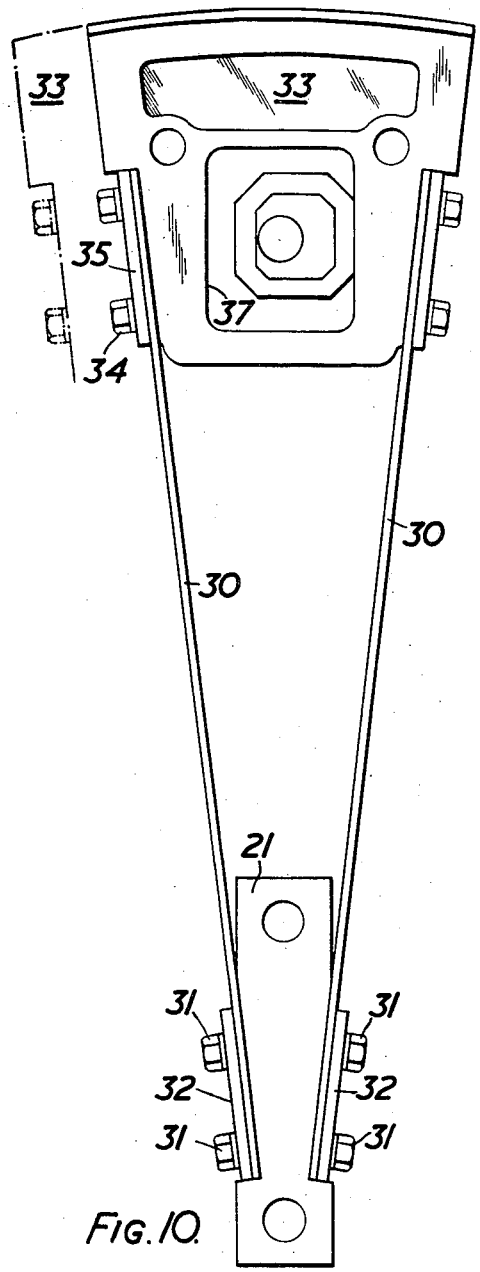
Figure 11:
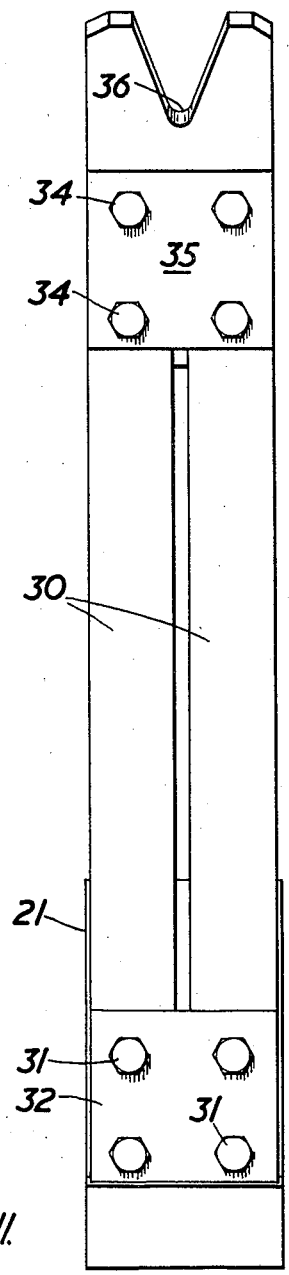

By way of example, the invention will be described in greater detail with reference to FIGS. 4–11 of the accompanying drawings in which:

FIGS. 4, 5 and 6 show schematically certain methods of coupling peripheral cable-receiving elements to the hub of a drum, pulley or sheave, FIG. 7 shows a front view of an embodiment of the invention, a portion being cut away to show schematically certain of the cable-receiving elements and associated components and their relative dispositions, FIG. 8 is a section on the line A—A of FIG. 7, FIG. 9 is a side view of FIG. 7, FIG. 10 is a detail view of a cable-receiving element and its resilient coupling arms, and FIG. 11 is a side view of FIG. 10.

The body of the sheave shown in FIG. 4 is cut radially to form slots as shown, thereby defining partial sectors 1 which extend from a hub H. The peripheral portion of each partial sector 1 has an approximately V-shaped cross-section, perpendicular to the plane of the drawing, which defines a peripheral cable-receiving surface 2.

In use of the apparatus shown in FIG. 4, as in the other examples to be described, a cable being laid passes under tension less than one complete turn around the sheave. There is a loss of tension across each partial sector 1 and the resultant force on the peripheral surface 2 of the partial sector 1 as the result of the tension drop will, if the tension drop is sufficiently large, cause a circumferential deflection of that partial sector in the direction of increasing tension due to the elastic properties of the sheave material. The deflection relieves the concentration of shear stress in the cable by producing a more uniform distribution of shear force over the length of cable in contact with the sheave. The sheave material and the number and width of the slots are so chosen, in relation to the diameter of the sheave and the characteristics of the cable to be laid, that a desired force/displacement characteristic for the partial sectors is obtained, e.g. one of the characteristics shown in FIG. 3.

In FIG. 5 a sheave 3 has a plurality of circumferentially spaced elements 4, each element having a peripheral cable-receiving surface of approximately V-shaped cross-section perpendicular to the plane of the drawing. Each element 4 is coupled to the body of the sheave 3 by a spring unit 5, which is secured to and between element 4 and the sheave 3, through which a restraining force is transmitted to a cable 6 passing, in use of the apparatus, over the elements for less than one complete turn around the sheave 3. The spring units 5 each have a suitable force/displacement characteristic, for example of one of the forms illustrated graphically in FIG. 3 and each element 4 is capable of limited circumferential movement relative to the body of the sheave against the action of its associated spring unit 5. Thus, by ensuring that each spring unit 5 cannot transmit a force greater than a preset maximum, the length of cable over which force is transmitted is greatly increased, thereby reducing the shear stress.

In the sheave indicated in FIG. 6 of the drawings, a plurality of wedge-shaped members 7 are mounted between respective pairs of radial spokes 8 extending from and integral with the boss or hub 9 of the sheave. Each wedge-shaped member has an arcuate peripheral cable-receiving surface having a V-shaped cross-section perpendicular to the plane of the drawing. Spring units 10 located between coupling members 7 and spokes 8, control and limit circumferential movement of the members 7. Each spring unit 10 has a force/displacement characteristic of one of the forms shown in FIG. 3. The members 7 are restrained from radial movement by pins 11 mounted in and between side plates integral with the boss 9. These side plates have, for clarity, been omitted from FIG. 6. The limited resilient circumferential movement of members 7 and their cable-receiving surfaces relative to the boss 9 of the sheave increases greatly the length of the cable 6 over which force is transmitted, as compared with a plain V-sheave, in a similar manner to that described with reference to FIG. 5.

The embodiments shown in FIGS. 4, 5 and 6 may have their V-grooves lined with a resilient material such as rubber having a characteristic such that peripheral movement in shear of an element along the line of the cable being laid is identical or similar to that of the cable in tension. The resilient material alternatively may be of composite construction and also may be faced with a metal surface on the cable side.

The embodiments of FIGS. 5 and 6 both involve sliding or rolling movement of the cable contacting elements or members with respect to the body of the sheave and this inevitably introduces frictional forces which cause variation of the cable tension at which an element or member starts to move and this is undesirable. Moreover, precautions must be taken to prevent deleterious materials finding access to the bearing surfaces of the elements or members. For example, cable is stored in the cable tanks of the cable ships in salt water and thus reaches the sheave in a wet condition and care must be taken to keep the salt water away from the bearing surfaces.

In an alternative construction, the elements or members are pivotally mounted on the sheave. It is impossible for the elements or members to be pivotally mounted at the center of the sheave which must have an axle but the use of pivot points spaced from the center results in tilting of the elements or members and this reduces the length of the element or member when they move due to shear stress between the cable being laid and that element or member with which the cable is in contact. Tilting can be reduced to an acceptable minimum by the use of at least two mounting arms per element or member, the arms lying along the radii of the sheave and pivoted at one end to the element or member and at the other end to the sheave at points conveniently close to the axle. If the pivoted arms are replaced by resilient arms, for example of leaf spring form, friction is eliminated and preloading of the elements or members can be effected easily. Two or more leaf springs per element or member may be used.

An embodiment of the invention using resilient arms is shown in FIGS. 7, 8, 9, 10 and 11. In FIG. 7 the cut-away portion is shown schematically, the detailed construction being as shown in FIGS. 8, 10 and 11. The sheave illustrated comprises a hub portion H to which a plurality of radially extending rigid coupling arms are secured between disc-shaped side plates 23 and 24. Each arm 21 has a pair of longitudinally spaced apertures, extending parallel to the sheave axis, through which respective bolts 25a and 26a pass as well as passing through corresponding apertures in side plates 23 and 24 and to hub H. The side plate 23 has a catcher ring 27 secured to it and also lifting or withdrawing handles 28. A gear wheel or sprocket 29 is secured to side plate 24 for coupling the sheave to driving and braking mechanism, which is not illustrated.

Four resilient arms 30 extend in a radial direction from each rigid coupling arm 21. The resilient arms 30 are secured to the unapertured sides of arms 21 by bolts 31 and clamping plates 32. The springs (resilient arms 30), in their free or unbiased condition, have a "set" which distorts them from a true linear form. The purpose of this "set" will be referred to later. In the drawings each unapertured side of an arm 21 is shown as having a pair of resilient arms 30 secured thereto. At the outer ends of the resilient arms 30 associated with a coupling arm 21 a rigid element 33, having the shape of a parallel faced truncated sector, is secured between the opposite pairs of those resilient arms 30 by bolts 34 and clamping plates 35. Each element has a circumferentially extending peripheral surface 36 which has a V-shaped cross-section as best shown in FIGS. 8 and 9. The surfaces 36 of the elements 33 provide the cable-receiving surface of the sheave.

The elements 33 have rectangular apertures 37 extending parallel to the sheave axis. Spindles 38 pass through the respective apertures 37 and are rotatably mounted between side plates 23 and 24. Rigid rectangular blocks 39, having rubber surfaces 40, are secured on the spindles in such manner that the distance between the axis of a spindle 38 and each of the four side faces of its associated block 39 differs. The rubber covered blocks 39 and their spindles 38 are so located within the apertures 37 that one of the side faces of the respective blocks 39 bears against the righthand face of the apertures 37, as is shown in FIG. 7. The blocks 39 tend to straighten the resilient arms 30 from their predistorted condition to a degree dependent upon which face of a block 39 bears against the righthand side wall of an aperture 37. The effect of the straightening is to preload the resilient arms 30, the preloading force depending upon the position of the blocks 39. FIG. 10 shows the relative positions of the resilient arms 30 when they are biased by their associated blocks 39 to a straightened condition. FIG. 10 also shows in dotted lines part of an element 33 in the position which the latter occupies before the springs (resilient arms 30) carrying the element are straightened by the block 39. All the springs (resilient arms 30) attached to the same arm 21 have corresponding "sets" so that in use of the apparatus a cable being laid and in contact with a particular rigid element 33 contacts that element along at least the greater part of the length of its peripheral surface 36 even when that rigid element 33 moves in a circumferential direction. The blocks 39 also limit the circumferential movement of their associated elements 33 in a clockwise direction as seen in FIG. 7.

In use of the sheave described with respect to FIGS. 8, 9, 10 and 11, three or more sheaves are arranged serially and each coupled to a driving and braking mechanism by their gear rings 29. A cable being laid passes around the upper portion of the cable-receiving surface of alternate sheaves and around the lower portion of the cable-receiving surface of the remaining sheaves. The lefthand and righthand sides of the sheave, as seen in FIG. 7, are the feed-on side and the feed-off side respectively. A back tension is applied, during laying, on the cable on the feed-on side of the first sheave in the series. During laying, when the shear stress between the cable and a particular element 33 of a sheave, which is dependent upon the tension drop across the portion of cable in contact with that element, is sufficient to overcome the preloading of the resilient arms 30 associated with that element, the element commences to move in a clockwise direction, as seen in FIG. 7 against the action of the resilient arms 30, the movement preventing further increase in the tension drop across the portion of cable in contact with that element.

As in the case of the previously described figures, the effect of this limited resilient circumferential movement of elements 33 under shear stress is to distribute the tension drop more evenly along the length of the cable in contact with the sheave. The sheave is so designed that, under normal cable-laying conditions the elements 33 in contact with the cable do not move to the full limit of their allowable movement.

In one example of a sheave constructed as shown in FIGS. 8–11, the sheave has an overall diameter of approximately 7 feet and has 24 circumferentially spaced cable-receiving elements each coupled to the hub of the sheave by four steel strips. In a particular cable-laying apparatus, three of these sheaves are arranged in series, each being coupled to driving and braking mechanism. The preloading of the resilient arms 30 of a sheave is chosen according to the position of the sheave in the series of sheaves. The sheave nearest the sea, the feed-off sheave, has resilient arms 30 with a higher preloading than the center sheave of the series which in turn has resilient arms 30 whose preloading is higher than those of the third or feed-on sheave. Advantage is taken of the fact that the permissible shear stress is increased by the radial loading produced by the cable tension. The different preloadings are obtained by imparting different curvatures or "sets" to the arms so that different forces are required to straighten the latter. In one particular embodiment, preloadings of 250 lbs., 170 lbs., and 120 lbs. are used respectively for the feed-off central and feed-on sheaves, there being also a total back tension on the cable of up to 750 lbs. which is applied to the cable before it reaches the feed-on sheave.

In each of the examples described with reference to FIGS. 4–6, and in the embodiment of the invention described with reference to FIGS. 7–11, the use of a sheave having a cable-receiving surface formed by a plurality of circumferentially spaced rigid elements each connected to the sheave by respective resilient coupling means can, by suitable choice of force/displacement characteristics of the coupling means, result in tension and shear stress distribution characteristics of the form shown in FIGS. 2(a) and 2(b) respectively being approached. It will be noted that the tension drop in a cable passing partly around a sheave constructed in accordance with the invention is not concentrated at the high tension end of the cable but is more uniformly distributed along the length of cable in contact with the sheave. Consequently the shear stress between the cable and the sheave tends towards a constant level which is relatively small in magnitude thereby reducing the possibility of damage to the cable.

The invention also may be applied to submarine-cable laying apparatus employing, instead of sheaves, either pulleys with flat cable-engaging surfaces or drums having a flat surface, it being understood that in such cases, during laying operations, a cable always will pass less than one complete turn around the pulley or drum.

We claim:

1. Apparatus for use in submarine cable-laying mechanism, and including a hub member, means for coupling the hub member to rotary-driving and braking mechanism, a plurality of pairs of spokes, each spoke predistorted from a straightened condition, all the spokes being angularly spaced apart from each other, secured to and extending in generally radial directions from the hub member, each spoke being capable of flexural movement in a plane normal to the axis of the hub member, a plurality of rigid elements having arcuate outer surfaces, the rigid elements secured to and between the outer ends of respective pairs of spokes whereby the rigid elements are held by the spokes in spaced radial relationship with the hub members so that the arcuate outer surfaces of the rigid elements together define a cable receiving surface having a circular contour coaxial with the hub member, the rigid elements also being circumferentially spaced apart from each other, biasing means for the respective pairs of spokes and operable to displace the spokes in a direction such that they move towards a straightened condition, whereby the spokes are preloaded by a force dependent upon the displacement, the biasing means permitting of limited circumferential movement of the rigid elements in the direction of the said displacement, which limited movement of a rigid element commences when the element is acted on by a force sufficient to overcome the preloading of the pair of spokes to which that element is connected, in use of the apparatus the said force being due to shear stress between a cable being laid and that element.

2. Apparatus according to claim 1, in which each spoke comprises two arms secured to the hub member in axially spaced relationship with each other.

3. Apparatus according to claim 2, in which the arms comprise steel strips.

4. Apparatus according to claim 1, in which each rigid element has an aperture extending parallel to the axis of the hub member, blocks located within the respective apertures and mounted for eccentric rotation, the blocks being adapted to co-operate with respective walls of the apertures whereby the rigid elements are circumferentially displaced and the spokes displaced towards the said straightened condition.

5. Apparatus according to claim 4, in which the blocks have rectangular cross-sections.

6. Apparatus for use in submarine cable-laying mechanism and including a hub member, means for coupling the hub member to rotary-driving and braking means, first and second groups of pairs of arms secured to the hub member and extending radially therefrom in generally radial directions, the first group of arms being axially displaced from the second group of arms, all the arms of the said groups being angularly spaced apart from each other and predistorted from a straightened condition, each of the said arms being capable of flexural movement in the direction of a plane normal to the axis of the hub member, a plurality of rigid elements having arcuate outer surfaces, each rigid element having an aperture extending in the direction of the axis of the hub member, each respective rigid element being secured to and between the outer ends of a pair of arms of the first group and a pair of arms of the second group, whereby the rigid elements are held by the spokes in spaced radial relationship with the hub member so that the arcuate outer surfaces of the rigid elements together define a cable receiving surface having a circular contour coaxial with the hub member, the rigid elements also being circumferentially spaced apart from each other, blocks mounted for ecectric rotation within the respective apertures of the rigid elements, each block adapted to co-operate with a wall of the aperture of a rigid element to displace that element in a circumferential direction such that the said arms connected to that element are displaced towards a straightened condition whereby they are preloaded by a force dependent upon the displacement, the said blocks permitting limited circumferential movement of the rigid elements in the direction of the said displacement of the arms, which limited movement commences when a rigid element is acted upon by an operating force sufficient to overcome the said preloading of the arms to which that rigid element is connected, in use of the apparatus the said operating force being due to shear stress between a cable being laid and that element.

7. Apparatus according to claim 6, in which the block has a rectangular cross-section.

8. Apparatus according to claim 6, in which the said arcuate outer surfaces of the rigid elements have V-shaped cross-sections.

References Cited in the file of this patent

UNITED STATES PATENTS

| | | |
|---|---|---|
| 708,455 | Blake | Sept. 2, 1902 |
| 2,363,257 | Matteucci | Nov. 21, 1944 |